H. A. BALLARD.
SIDE EXPANSION TREE.
APPLICATION FILED APR. 26, 1909. RENEWED JUNE 4, 1912.
1,054,082.
Patented Feb. 25, 1913.
3 SHEETS—SHEET 1.
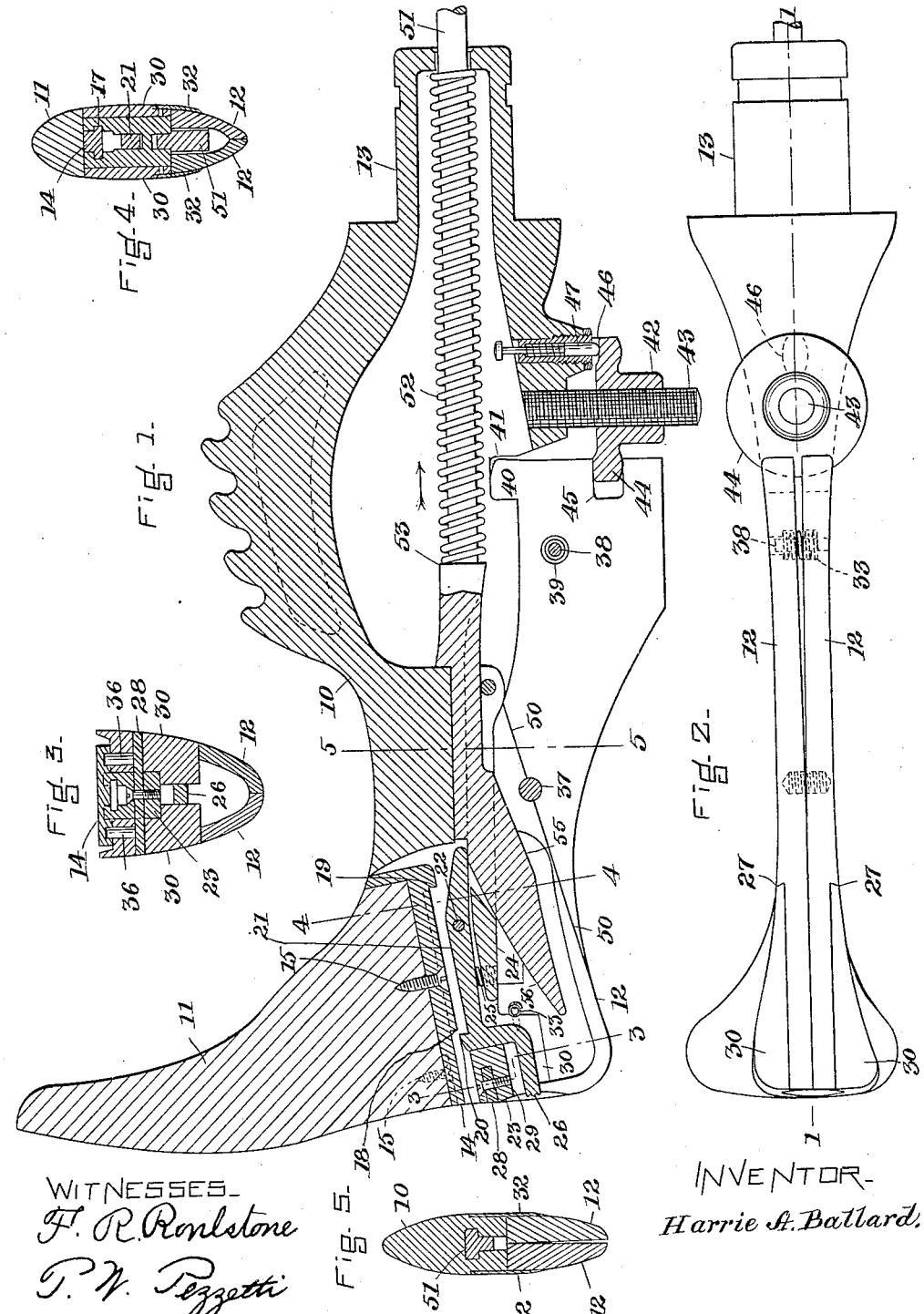
WITNESSES
F. R. Roulstone
T. W. Pezzetti
INVENTOR
Harrie A. Ballard.
by Wright Brown Quinby May
Atty's.

H. A. BALLARD.
SIDE EXPANSION TREE.
APPLICATION FILED APR. 26, 1909. RENEWED JUNE 4, 1912.
1,054,082.
Patented Feb. 25, 1913.
3 SHEETS—SHEET 2.
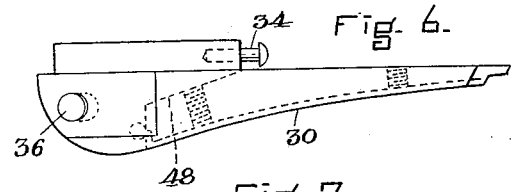
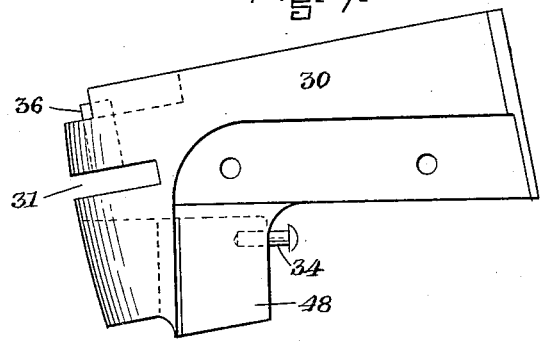
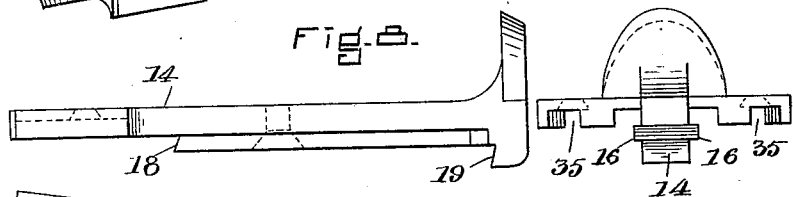
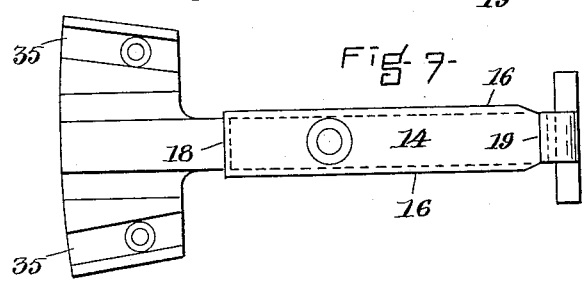
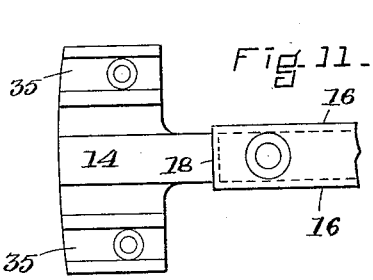
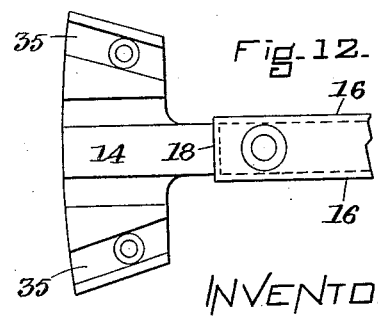
WITNESSES.
F. R. Roulstone.
P. W. Pezzetti
INVENTOR.
Harrie A. Ballard.
by Wright Brown Quimby May
Atty's.

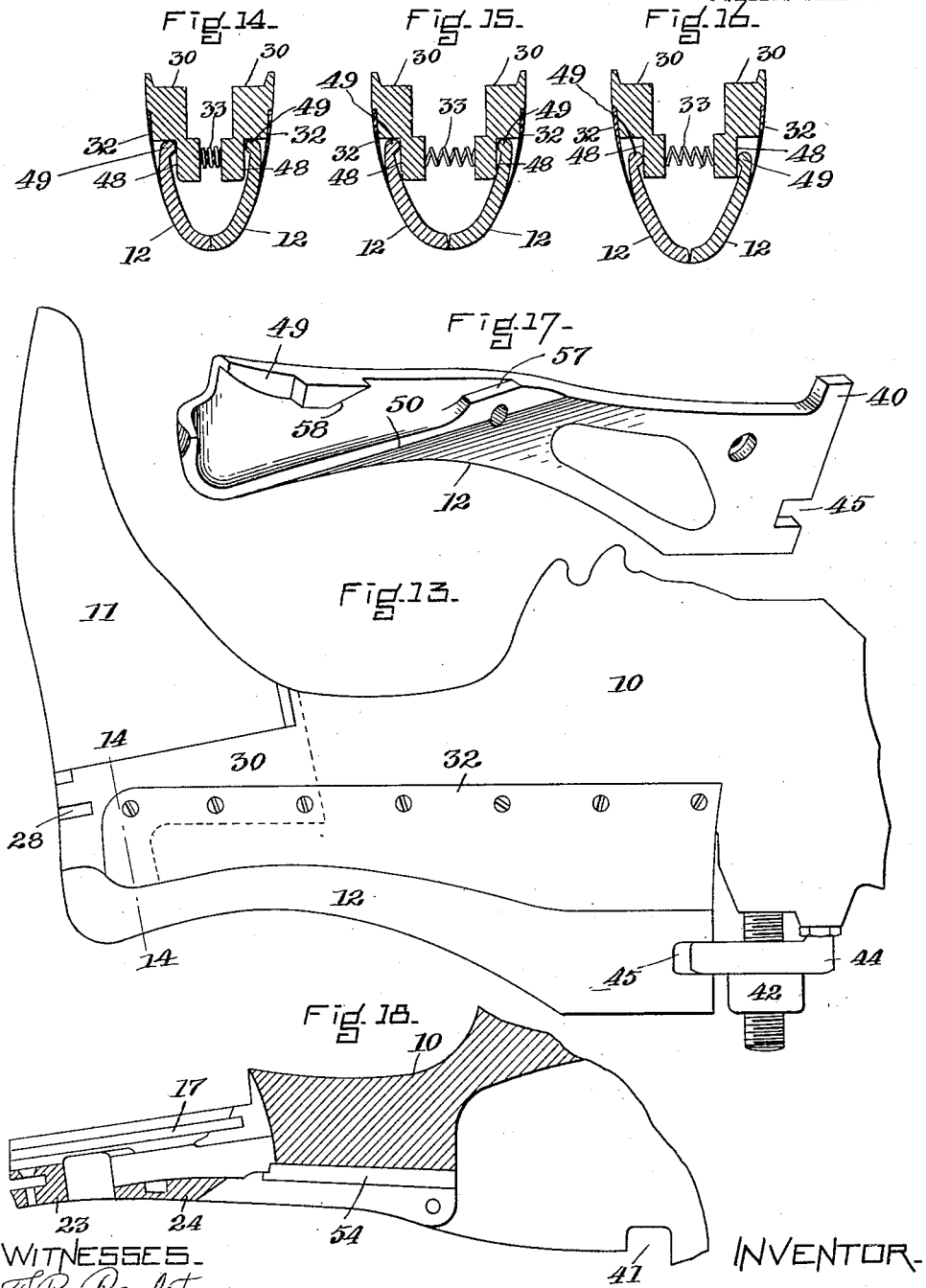

UNITED STATES PATENT OFFICE.

HARRIE A. BALLARD, OF BOSTON, MASSACHUSETTS, ASSIGNOR TO THE BOYLSTON MANUFACTURING COMPANY, OF SOUTH BOSTON, MASSACHUSETTS, A CORPORATION OF NEW JERSEY.

SIDE-EXPANSION TREE.

1,054,082. Specification of Letters Patent. Patented Feb. 25, 1913.

Application filed April 26, 1909, Serial No. 492,381. Renewed June 4, 1912. Serial No. 701,658.

*To all whom it may concern:*

Be it known that I, HARRIE A. BALLARD, of Boston, in the county of Suffolk and State of Massachusetts, have invented certain new and useful Improvements in Side-Expansion Trees, of which the following is a specification.

This invention relates to trees used in the process of manufacturing boots and shoes, and has for its object to provide an improved expansible and collapsible tree leg in combination with a movable foot piece. The tree leg is characterized by having laterally expansible and collapsible sides and an expansible and collapsible back split on a longitudinal median plane and comprising two sections, each associated with one of the sides and arranged to be expanded and contracted thereby and at the same time to be movable with its complemental back section longitudinally of the foot.

Another feature of the invention is the construction and arrangement of the back sections whereby their rear edges are always maintained in coöperative engagement, thus avoiding the liability of pinching the work between them.

Referring to the accompanying drawings which illustrate one form in which the invention may be embodied, Figure 1 is a central longitudinal section of a tree leg including a sliding foot and a plurality of sections adapted to be expanded. Fig. 2 represents a rear edge view thereof. Fig. 3 is a section on line 3—3 of Fig. 1. Fig. 4 is a section on line 4—4 of Fig. 1. Fig. 5 is a section on line 5—5 of Fig. 1. Fig. 6 is a front elevation of one of the side sections. Fig. 7 is a side elevation thereof. Fig. 8 is a side elevation of a sliding member for coupling the foot to the leg. Fig. 9 is a rear elevation thereof. Fig. 10 is an end view thereof. Figs. 11 and 12 are fragments of coupling members adapted for different sizes of foot. Fig. 13 is a side elevation of the major portion of the tree shown in Fig. 1. Fig. 14 is a section on line 14—14 of Fig. 13. Fig. 15 is a section of the same parts expanded laterally. Fig. 16 is a section of the same parts expanded both laterally and longitudinally. Fig. 17 is a perspective view of one of the back sections. Fig. 18 is a central longitudinal section of the ankle portion of the leg.

The same reference characters indicate the same parts wherever they occur.

The tree comprises essentially a leg 10, a foot or forepart 11, and a pair of back sections 12, 12 constituting the heel portion. The leg is preferably formed with a cylindrical portion 13 at its upper end adapted to be mounted in a suitable bearing in a treeing stand in which it may turn to various positions. All of the parts are preferably formed of metal with the exception of the foot or forepart 11 which is preferably formed of wood.

The foot is movable longitudinally of the leg and is preferably coupled by means of a slide or coupling member 14 shown in detail by Figs. 8 to 12. The coupling member is provided with screw holes adapted to receive screws 15 by which it may be permanently attached to the rear face of the foot. The body portion of the coupling member is T-shaped in cross section, being formed with laterally extending ribs 16 which are adapted to slide in grooves 17 formed in the ankle portion of the leg, see Figs. 4 and 18. The coupling member is also formed with stop shoulders 18 and 19 which are in different planes and which are adapted to be engaged by a coöperative nose 20 formed upon a latch 21. The latch is within the ankle portion of the leg and is mounted upon a transverse pin 22 about which it is adapted to oscillate. The ankle portion of the leg is open from front to rear but the two sides thereof are connected by two bridging portions 23 and 24 which materially strengthen the two sides. The portion 24 is formed with a socket to receive a spring 25 which engages the latch 21 and tends to normally hold the nose 20 in engagement with the coupling member 14. The stop shoulder 18 is adapted to be engaged by the nose 20 when the foot is in closed position, and the shoulder 19 is adapted to engage the nose 20 and so limit the movement of the foot when it is withdrawn from the leg. The latch 21 is further provided with an extension 26 adapted to be engaged by a finger whereby the nose 20 may be so far retracted as to permit entire removal of the foot.

The leg is provided with independently movable side sections 30 which are interposed between the back sections 12 and the foot. The side sections constitute the portions between the ankle and the arch and they are adapted to be expanded laterally as hereinafter described. The upper ends of the sections 30 are adapted to fit against undercut shoulders 27 formed on opposite sides of the leg, see Fig. 2. The shoulders 27 constitute fulcra about which the sections 30 may swing for the purpose of expanding and contracting their opposite ends. The sections 30 are formed with transverse slots 31, see Fig. 7, which are adapted to receive a cross bar 28 let into the bridge portion 23 and fastened by a screw 29. The cross bar 28 serves to maintain the sections 30 in coöperative engagement with their fulcra 27 and serves also to guide them when moved laterally. The sections may be otherwise secured in their proper position by means of thin flexible sheet metal strips 32 screwed to the opposite sides of the leg and also to the said sections. The strips 32 may be sufficiently broad to overlap the back sections 12 to guide them as hereinafter explained. A short helical spring 33 is provided for drawing the side sections together, see Figs. 1, 14, 15, and 16. For the purpose of connecting the spring, each section 30 may be provided with a pin 34.

The free ends of the side sections are adapted to be expanded and contracted by the movement of the foot toward and from the leg and for this purpose the coupling member 14 is formed with diverging grooves 35 whose side walls are adapted to engage pins 36 projecting from the sections 30.

Figs. 9 and 12 illustrate coupling members adapted for different sizes of foot. The coupling member shown by Fig. 12 is adapted for a relatively large size and its grooves 35 are formed at a relatively steep angle. The coupling member shown by Fig. 9 is adapted for an intermediate size and the inclination of its grooves 35 is perceptibly less than that of the form shown by Fig. 12. The form shown by Fig. 11 is adapted for a small size and its grooves 35 are preferably parallel as shown. When the foot is moved from extended position to working position, the walls of the diverging grooves engage the pins 36 and separate them, thus expanding the sections 30. With reference to the grooves in the coupling member shown by Fig. 11, it is obvious that they would not produce any expanding effect upon the sections 30, but if desired the grooves instead of being parallel might be even less divergent than those shown in Fig. 9.

The back sections 12 are divided on a longitudinal central plane and are adapted to be moved in unison toward and from the foot 11. They are coupled together by a headless screw 37 which is threaded in the contiguous portions of the two sections as shown by Fig. 2. The screw 37 is formed so as to fit loosely in the screw-threaded sockets formed for its reception, for the purpose of permitting slight movement of one section 12 relatively to the other for a purpose hereinafter explained. The upper ends of the sections 12 are otherwise connected by a transverse pin 38 which is surrounded by a helical compression spring 39 tending to separate the upper ends and consequently to close the lower ends. The upper ends of the sections 12 are formed with tongues 40 adapted to occupy a notch 41 formed in the leg. The sections 12 are adapted to swing about the tongues 40 when the heel portions are moved toward or from the foot. A nut 42 threaded on a fixed stud 43 and formed with a flange 44 occupying notches 45 formed in the sections 12 serves to adjust the sections toward and from the leg 10. The flange 44 is formed with an indentation 46 which is adapted to receive a spring follower 47 mounted in the leg whereby the nut may be prevented from unduly turning upon the stud 43.

The back sections 12 are not only adapted to be moved longitudinally toward and from the foot but are also adapted to be expanded laterally by and with the side sections 30. In order to provide for the lateral expansion of the sections 12, the sections 30 are cut away as indicated in Figs. 7, 14, 15 and 16, thus providing parallel faces 48. The side strips 32 overlap the portions thus cut away and form pockets adapted to receive the overlapping portions of the sections 12. The portions of the sections 12 adapted to fit between the strips 32 and the faces 48 are formed with inwardly extending ridges or flanges 49 adapted to bear against said faces and to be confined by the strips 32. The contiguous faces of the sections 12 are formed on different planes slightly inclined to each other and defined by a slight ridge 50 as shown by Fig. 17. The ridges 50 coincide with a perpendicular line extending upwardly from the back of the heel and constitute fulcra upon which the two sections may be rocked with relation to each other. The line of the ridges 50 intersects the axis of the connecting screw 37 which, as hereinbefore stated, is loosely fitted in the two sections. The stud 37 therefore constitutes a hinge about which the two sections may swing within a limited range of movement, the ridges 50 being the axis of such movement. The effect of the spring 39 is to maintain the heel portions of the sections 12 in contact with each other and to prevent the coöperating edges from separating so as to produce a gap when the sections are expanded laterally as hereinafter explained.

Fig. 14 shows the side section 30 and the back sections 12 in contracted position. Fig. 15 shows them in the position they occupy when the sections 30 are expanded laterally.

In this figure it will be noticed that the sections 30 are separated and that the overlapping edges of the sections 12 are correspondingly separated, but that the contiguous rear edges of the sections 12 remain in contact with each other. The latter position illustrates the parts as they appear when the foot 11 is in working position.

The leg 10 is provided with a jacking rod 51 which is for the purpose of moving the sections 12 toward and from the foot. The rod 51 is longitudinally movable in the leg and is normally held toward the foot by a helical spring 52 compressed between the end wall of the leg and a shoulder 53 formed on the rod. On the line 5—5 of Fig. 1, the rod is T-shaped in cross section and has a sliding fit in a groove 54 formed in the leg for its reception. The end of the jacking rod is formed with a face 55 for expanding the back sections and with a face 56 for contracting the back sections and for actuating the latch 22 as hereinafter explained. When the jacking rod is moved in the direction of the arrow in Fig. 1, the face 55 which is inclined to its direction of movement, engages correspondingly inclined shoulders 57 formed on the two sections 12 and thus swings the sections to the rear. The face 56 of the jacking rod has sliding engagement with shoulders 58 formed on the sections 12, and is adapted to swing the sections toward the foot when the jacking rod is moved in the opposite direction. The face 56 is extended back beyond the point of engagement with the shoulders 58 and engages one end of the latch 21 as shown by Fig. 1. When the jacking rod is in normal position it holds the latch 21 so that the nose 20 is retracted from the path of the stop shoulder 18 and in the path of the stop shoulder 19. When the latch is in this position, the foot is free to be withdrawn until the shoulder 19 engages the nose 20. When the jacking rod is retracted in the direction of the arrow to expand the back sections, the inclined face 56 enables the latch 21 to respond to the tension of the spring 25 so as to place the nose 20 in engagement with the stop shoulder 18, and thus lock the foot in working position. Upon subsequent closing movement of the jacking rod, the latch 21 is retracted by the action of the inclined face 56 so as to move the nose 20 to the position illustrated.

Referring now to Figs. 15 and 16, it will be seen that the sections 30 are not disturbed by longitudinal movement of the sections 12. The faces 48 are parallel to each other as hereinbefore explained and likewise parallel to the direction of movement of the sections 12. Consequently the longitudinal movement of the sections 12 in no way conflicts with the lateral expansion of the sections 30 or of the forward edges of the sections 12.

Having thus explained the nature of my said invention and described a way of constructing and using the same, although without attempting to set forth all of the forms in which it may be made or all of the modes of its use, I declare that what I claim is:—

1. A tree having a leg, a split back comprising two sections, and yielding means for forcing the sections together at the heel.

2. A tree having a leg, a split back comprising two sections adapted to contact at the heel, and yielding means for holding them in contact at the heel.

3. A tree having a leg, a split back comprising two sections adapted to contact at the heel, means loosely connecting them, and yielding means for maintaining contact thereof at the heel portions.

4. A tree having a leg, and a back split longitudinally from front to rear and comprising two sections having meeting rear edges, said sections being adapted to rock each upon the meeting edge of the other.

5. A tree having complemental back sections divided on a longitudinal plane each adapted to rock upon the back edge of the other, means for spreading the forward edges of said sections, and means exerting yielding tension for holding the back edges thereof in contact.

6. A tree having complemental back sections divided on a plane coinciding with a back seam each adapted to rock on the back edge of the other, means for moving the back sections forward and backward, side sections adapted to expand and contact laterally and move the forward edges of the back sections, means for holding the back edges of the back sections in contact with each other, a sliding foot, and means operable by the foot for expanding and contracting the sides.

7. A tree having a leg comprising laterally movable side sections, complemental back sections connected in hinged relation on a line coinciding with a back seam and engaging the side sections so as to be opened and closed thereby, a foot having sliding relation with the leg, coöperative means on the foot and side sections whereby said sections may be expanded and contracted by movement of the foot, and means for moving the back sections forward and backward.

8. A tree comprising a leg and sliding foot, stop shoulders on the foot, a manually movable latch in the leg adapted to engage said stop shoulders to lock the foot in working position or to limit its receding movement, and a jacking rod adapted to move the catch out of the plane of the locking shoulder and into the plane of the limiting shoulder.

9. A tree comprising a leg and removable sliding foot, stop shoulders on the foot, a jacking rod, and a latch adapted to normally engage one of said stops to lock the foot in working position, to be moved by said jacking rod out of the plane of the locking shoulder into the path of another stop shoulder, and to be manually retracted to permit removal of the foot.

10. A tree having complemental back sections divided on a longitudinal plane each adapted to rock upon the back edge of the other, and means for spreading the forward edges of said sections and maintaining their rear edges in contact, said sections being movable from front to rear with relation to said means.

11. A tree having complemental back sections divided on a plane coinciding with a back seam each adapted to rock on the back edge of the other, means for moving the back sections forward and backward, side sections adapted to expand and contract laterally and move the forward edges of the back sections, and means for holding the back edges of the back sections in contact with each other.

12. A tree having a leg, and a back comprising two contiguous sections divided on a longitudinal median plane, said sections being laterally expansible, and means for expanding the forward portions of said sections and maintaining the rear edges thereof in contact.

13. A tree comprising a leg, a foot, a back consisting of two complemental sections divided on a longitudinal plane of the foot and leg, said sections being laterally expansible and movable longitudinally of the foot, and means for laterally expanding the forward portions of said sections and maintaining the rear edges thereof in contact.

14. A tree having a leg comprising laterally movable side sections, complemental back sections contacting with each other on a line coinciding with a back seam, said side sections being connected with the back sections so as to expand and contract the same and permit forward and back movement of the back sections, means for expanding the side sections, and means for moving the back sections to the rear.

In testimony whereof I have affixed my signature, in presence of two witnesses.

HARRIE A. BALLARD.

Witnesses:
W. P. ABELL,
P. W. PEZZETTI.

---

Copies of this patent may be obtained for five cents each, by addressing the "Commissioner of Patents, Washington, D. C."